(12) United States Patent
Pohlack et al.

(10) Patent No.: US 8,612,694 B2
(45) Date of Patent: Dec. 17, 2013

(54) PROTECTING LARGE OBJECTS WITHIN AN ADVANCED SYNCHRONIZATION FACILITY

(75) Inventors: Martin T. Pohlack, Dresden (DE);
Michael P. Hohmuth, Dresden (DE);
Stephan Diestelhorst, Dresden (DE);
David S. Christie, Austin, TX (US);
Jaewoong Chung, Bellevue, WA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 323 days.

(21) Appl. No.: 13/041,867

(22) Filed: Mar. 7, 2011

(65) Prior Publication Data
US 2012/0233411 A1    Sep. 13, 2012

(51) Int. Cl.
*G06F 12/10*    (2006.01)
(52) U.S. Cl.
USPC ........................................................ 711/147
(58) Field of Classification Search
None
See application file for complete search history.

(56) References Cited

U.S. PATENT DOCUMENTS

| | | | |
|---|---|---|---|
| 2009/0172292 A1* | 7/2009 | Saha et al. | 711/135 |
| 2010/0023703 A1 | 1/2010 | Christie et al. | |
| 2010/0023704 A1 | 1/2010 | Christie et al. | |
| 2010/0023706 A1 | 1/2010 | Christie et al. | |
| 2010/0023707 A1 | 1/2010 | Hohmuth et al. | |

OTHER PUBLICATIONS

Wikipedia, ABA problem, http://en.wikipedia.org/wiki/ABA_problem, printed Jul. 13, 2012.
S. Diestelhorst et al, Hardware Acceleration for Lock-Free Data Structures and Software-Transactional Memory, Aug. 14, 2008.
Advanced Micro Devices, Inc., Advanced Synchronization Facility, Proposed Architectural Specification, Rev. 2.1, Mar. 2009.
D. Christie et al., Evaluation of AMD's Advanced Synchronization Facility Within a Complete Transactional Memory Stack, 2010.
AMD Publications, http://www.amd64.org/publications.html, printed Mar. 7, 2011.
H. E. Ramadan et al., Dependence-Aware Transactional Memory for Increased Concurrency, http://www.cs.utexas.edu/~rossbach/pubs/tx-micro08.pdf.

* cited by examiner

*Primary Examiner* — Duc Doan
(74) *Attorney, Agent, or Firm* — Volpe and Koenig, P.C.

(57) ABSTRACT

A system and method are disclosed for allowing protection of larger areas than memory lines by monitoring accessed and dirty bits in page tables. More specifically, in some embodiments, a second associative structure with a different granularity is provided to filter out a large percentage of false positives. By providing the associative structure with sufficient size, the structure exactly specifies a region in which conflicting cache lines lie. If entries within this region are evicted from the structure, enabling the tracking for the entire index filters out a substantial number of false positives (depending on a granularity and a number of indices present). In some embodiments, this associative structure is similar to a translation look aside buffer (TLB) with 4 k, 2M entries.

20 Claims, 5 Drawing Sheets

PROTECTING LARGE OBJECTS WITHIN AN ADVANCED SYNCHRONIZATION FACILITY

BACKGROUND OF THE INVENTION

1. Field of the Invention

Embodiments of the invention relate generally to information processing systems. More specifically, embodiments of the invention provide an improved system and method for protecting large objects within an advanced synchronization facility.

2. Description of the Related Art

Shared-memory computer systems allow multiple concurrent threads of execution to access shared memory locations. Unfortunately, writing correct multi-threaded programs is difficult due to the complexities of coordinating concurrent memory access. One approach to concurrency control between multiple threads of execution is transactional memory. In a transactional memory programming model, a programmer may designate a section of code (i.e., an execution path or a set of program instructions) as a "transaction," which a transactional memory system should execute atomically with respect to other threads of execution. For example, if the transaction includes two memory store operations, then the transactional memory system ensures that all other threads may only observe either the cumulative effects of both memory operations or of neither, but not the effects of only one.

To implement transactional memory, memory accesses are sometimes executed one by one speculatively and committed all at once at the end of the transaction. Otherwise, if an abort condition is detected (e.g., data conflict with another processor), those memory operations that have been executed speculatively may be rolled back or dropped and the transaction may be reattempted. Data from speculative memory accesses may be saved in a speculative data buffer, which may be implemented by various hardware structures, such as an on-chip data cache.

Various transactional memory systems have been proposed, including those implemented by software, by hardware, or by a combination thereof. However, many traditional implementations are bound by various limitations. For example, hardware-based transactional memory proposals (HTMs) sometimes impose limitations on the size of transactions supported (i.e., maximum number of speculative memory operations that can be executed before the transaction is committed). Often, this may be a product of limited hardware resources, such as the size of one or more speculative data buffers used to buffer speculative data during transactional execution.

One example of a transactional memory system is the Advanced Synchronization Facility (ASF) proposed by Advanced Micro Devices (AMD). The ASF allows user and system level code to modify a set of memory objects atomically without requiring expensive synchronization mechanisms. One issue that is present in transactional memory systems such as the ASF relates to enabling tracking of large read sets without requiring large amounts of hardware resources. For example within certain cache based transactional memory systems it is possible that cache conflicts can cause the system to pessimistically promote speculative information to the entire index of a cache on eviction of tracked data. Such an operation can potentially cause false positives as every certain number of cache lines can cause a conflict with the index.

SUMMARY OF EMBODIMENTS OF THE INVENTION

A system and method are disclosed for allowing protection of larger areas than memory lines by monitoring accessed and dirty bits in page tables. More specifically, in some embodiments, a second associative structure with a different granularity is provided to filter out a large percentage of false positives. By providing the associative structure with sufficient size, the structure exactly specifies a region in which conflicting cache lines lie. If entries within this region are evicted from the structure, enabling the tracking for the entire index filters out a substantial number of false positives (depending on a granularity and a number of indices present). In some embodiments, this associative structure is similar to a translation look aside buffer (TLB) with 4 k, 2M entries.

Also, in some embodiments, an overlapping range cache tracks speculatively accessed locations. Also, in some embodiments, when using a TLB, incoming probes are used to query the TLB with physical addresses. More specifically, the system and method allows protection of larger areas than memory lines by monitoring accessed and dirty bits in page tables. The system and method includes cache lines that cache a page table entry (PTE) for a memory area into a transactional memory system watch set to detect probes from other processor for the lines. These probes are only generated if remote TLBs do not have corresponding entries cached, therefore a remote TLB shoot down operation is performed.

The system and method further provide read access to the page tables and a translation from the target area to its corresponding PTE address. In certain embodiments, the read access and translation are provided by an operating system. In other embodiments, the system and method provides a transactional memory system instruction which doesn't include a memory line itself into a watch set of the transactional memory system, but instead provides the page table entry of the memory line. With such a system and method, objects which are stored within large areas of memory can be protected. For example, in an embodiment where a single cache line contains 64 bytes, each cache line can cover 8 page table entries. Also, in certain embodiments, the protected areas are multiples of 32 Kbytes and are aligned correspondingly (unless super pages or sparse allocation of page table entries are used).

In certain embodiments, the system and method do not provide rollback storage. Accordingly, these embodiments are mostly useful for large read sets. However, these embodiments can protect against remote reads and writes independently.

BRIEF DESCRIPTION OF THE DRAWINGS

The present invention may be better understood, and its numerous objects, features and advantages made apparent to those skilled in the art by referencing the accompanying drawings. The use of the same reference number throughout the several Figures designates a like or similar element.

DETAILED DESCRIPTION

Transactional memory systems may allow software threads in multi-threaded systems to access (read and/or write) a set of shared memory locations atomically with respect to other threads, without requiring the overhead and programming complexity associated with traditional synchronization mechanisms such as mutual-exclusion using locks. However, further techniques are necessary for increasing the efficiency of transactional memory systems.

According to some embodiments, various hardware mechanisms may be used to implement efficient transactional memory mechanisms, as described herein. In some embodiments, computationally inexpensive primitives (e.g., program instructions) may be defined for instructing the hardware to perform various synchronization functions, which may be used to synthesize higher-level synchronization mechanisms. The hardware mechanisms and/or program instructions may collectively be referred to herein as the Advanced Synchronization Facility (ASF).

In some embodiments, an existing processor architecture (e.g., x86) may be augmented to implement ASF mechanisms. For clarity of explication, the remainder of this disclosure describes how the known 64-bit x86 architecture AMD64 may be augmented with ASF mechanisms to implement transactional memory. However, these example embodiments are not intended to limit ASF mechanisms to this architecture alone and given the benefit of this disclosure, implementations of ASF mechanisms in other processor architectures will become evident to those skilled in the art.

Figure 1:
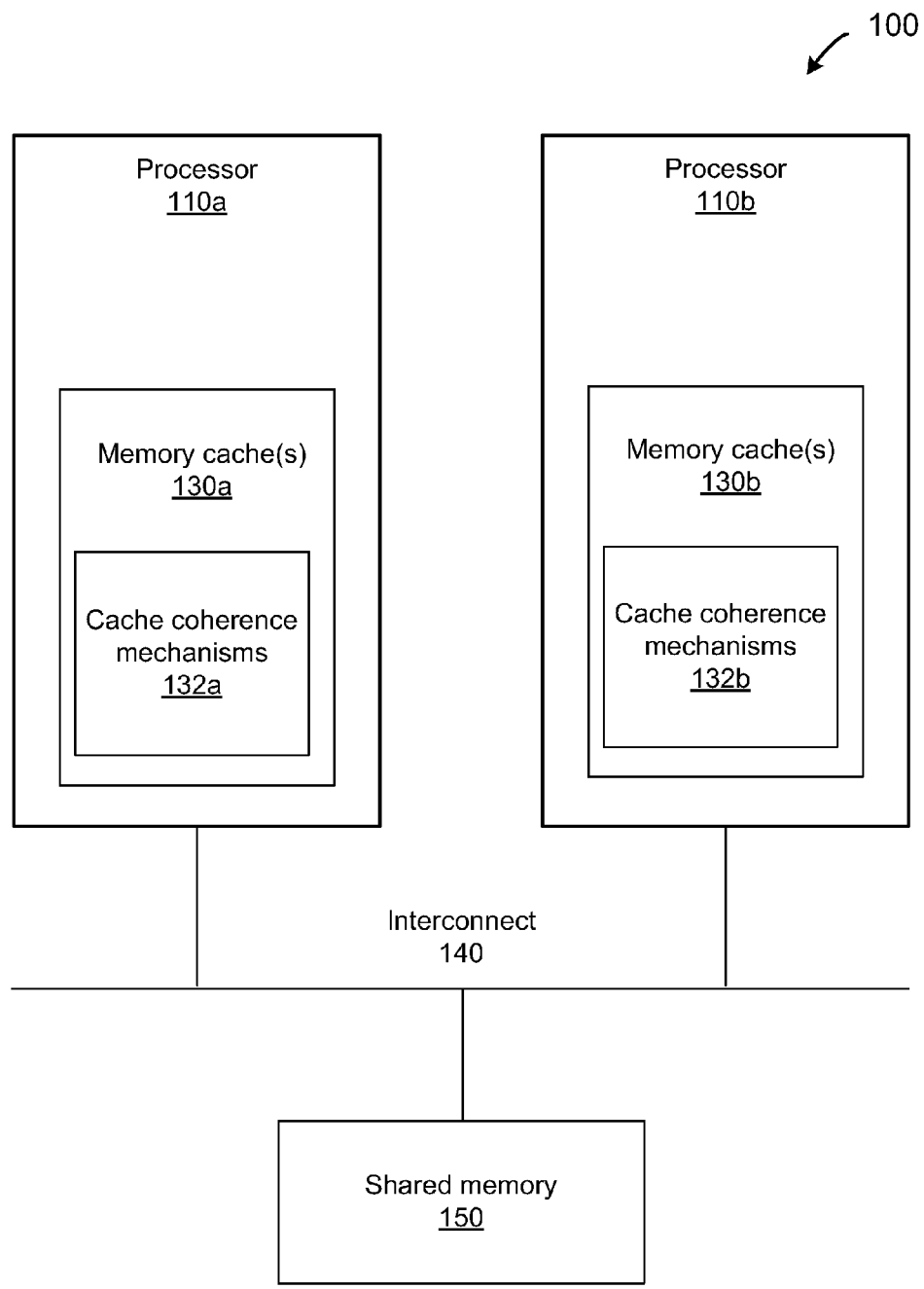
FIG. 1 is a generalized block diagram showing components of a multi-processor computer system configured to implement an advanced synchronization facility.

FIG. 1 is a block diagram illustrating components of a multi-processor computer system configured to implement ASF, according to various embodiments. According to the illustrated embodiment, computer system 100 may include multiple processors, such as processors 110a and 110b. In some embodiments, processors 110 may comprise multiple physical or logical (e.g., SMT) cores and be coupled to each other and/or to a shared memory 150 over an interconnect, such as 140. In various embodiments, different interconnects may be used, such as a shared system bus or a point-to-point network in various topographies (e.g., fully connected, torus, etc.).

According to the illustrated embodiment, each processor 110 may include one or more levels of memory caches 130. Levels of memory caches may be hierarchically arranged (e.g., L1 cache, L2 cache, L3 cache, etc.) and may be used to cache local copies of values stored in shared memory 150.

In various embodiments, memory caches 130 may include various cache coherence mechanisms 132. Cache-coherence mechanisms 132 may, in one embodiment, implement a cache coherence communication protocol among the interconnected processors to ensure that the values contained in memory caches 130 of each processor 110 are coherent with values stored in shared memory and/or in the memory caches of other processors. Several such protocols exist (including the MESI (i.e., Illinois protocol) and MOESI protocols), and may be implemented in various embodiments. Cache coherence protocols may define a set of messages and rules by which processors may inform one another of modifications to shared data and thereby maintain cache coherence. For example, according to the MESI protocol, each block stored in a cache must be marked as being in one of four states: modified, exclusive, shared, or invalid. A given protocol defines a set of messages and rules for sending and interpreting those messages, by which processors maintain the proper markings on each block. Depending on the state of a given cache block, a processor may be restricted from performing certain operations. For example, a processor may not execute program instructions that depend on a cache block that is marked as invalid. Cache coherence mechanisms may be implemented in hardware, software, or in a combination thereof, in different embodiments. Cache coherence messages may be may be communicated across interconnect 140 and may be broadcast or point-to-point.

Figure 2:
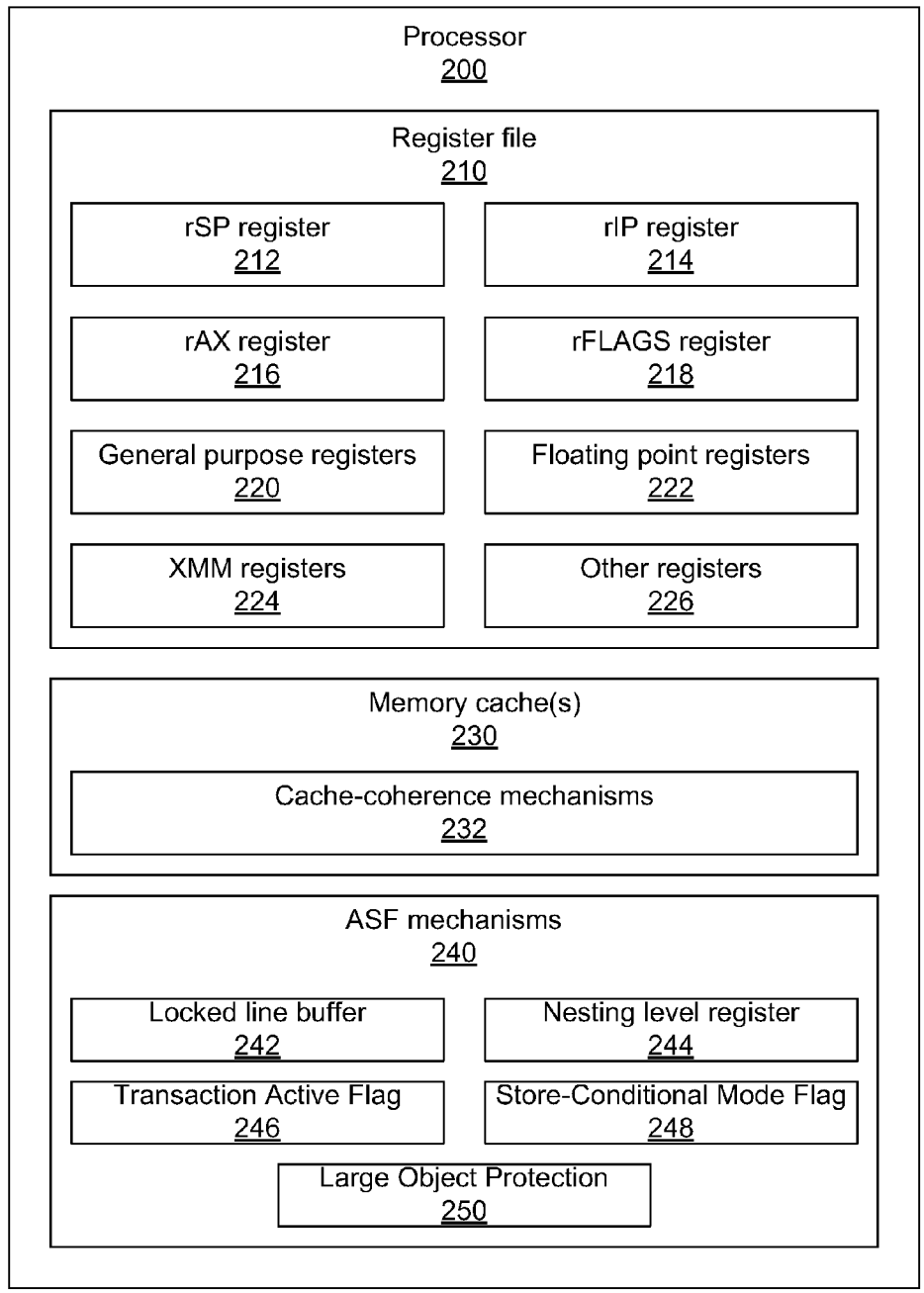
FIG. 2 is a block diagram showing a more detailed view of components comprising a processor.

FIG. 2 is a block diagram illustrating a more detailed view of components comprising a processor, such as processors 110, according to one embodiment. According to the illustrated embodiment of FIG. 2, processor 200 comprises register file 210, which may include various registers, each of which may be of any size (e.g., 16-bit, 32-bit, 64-bit, 128-bit, etc.) For example, register file 210 may include various known x86 registers, such as rSP register 212 (stack pointer), rIP register 214 (instruction pointer), rAX register 216 (accumulator register), and/or rFLAGS register 218 (flags register indicating processor state). In some embodiments, register file 210 may further comprise any number of general purpose registers 220 and/or floating point registers 222. In some embodiments, register file 210 may include one or more 128-bit registers, such as XMM registers 224. In various embodiments, register file 210 may comprise any number of other registers 226, which may be of various sizes.

According to the illustrated embodiment, processor 200 may include memory caches 230 for storing local copies of values in shared memory and cache-coherence mechanisms 232 for maintaining the consistency of those values across various copies dispersed within shared memory, the cache, and other caches. Processor 200 may also include ASF mechanisms 240 for implementing transactional synchronization mechanisms, as described herein. ASF mechanisms 240 may include the data structures and/or logic to implement memory transactions as described herein, according to various embodiments. In some embodiments, ASF mechanisms 240 may include a locked line buffer 242, which may be used in case of an abort to roll back memory changes made by a partially executed transaction, as described below. In some embodiments, ASF mechanisms 240 may include a nesting level register 244, which may hold a value indicating the depth to which the current transaction is nested in other transactions, as described below in more detail. In some embodiments ASF mechanisms may include a flag to indicate whether a transaction is active, such as transaction active flag 246. In some embodiments, ASF mechanisms may include a flag indicating a transactional mode, such as store-conditional mode flag 248, which may be set to indicate whether an executing transaction is executing in store-conditional mode or in another mode. In further embodiments, other flags and/or registers may be implemented in ASF mechanisms 240 in support of transactional execution.

According to the illustrated embodiment, ASF mechanisms 240 may include data structures and/or logic to implement a large object protection module 250 for allowing protection of larger areas than memory lines by monitoring accessed and dirty bits in page tables. More specifically, in various embodiments, the large object protection module 250 provides a second associative structure (as compared with a first associative structure within the ASF mechanism 240) with a different granularity that the first associative structure. The second associative structure filters out a large percentage of false positives. By providing the second associative structure with sufficient size, the second associative structure exactly specifies a region in which conflicting cache lines lie. If entries within this region are evicted from the structure, enabling the tracking for the entire index filters out a substantial number of false positives (depending on a granularity and a number of indices present). In various embodiments, this associative structure is similar to a translation look aside buffer (TLB) with 4 k, 2M entries.

Also, in various embodiments, an overlapping range cache tracks speculatively accessed locations. Also, in various embodiments, when using a TLB, incoming probes are used to query the TLB with physical addresses. More specifically, the large object protection module allows protection of larger areas than memory lines by monitoring accessed and dirty bits in page tables. The large object protection module 250 includes cache lines that cache a page table entry (PTE) for a memory area into a transactional memory system watch set to detect probes from other processor for the lines. These probes are only generated if remote TLBs do not have corresponding entries cached, therefore a remote TLB shoot down operation is performed.

In various embodiments, the large object protection module 250 further provides read access to the page tables and a translation from the target area to its corresponding PTE address. In various embodiments, the read access and translation are provided by an operating system. In other embodiments, the large object protection module 250 provides a transactional memory system instruction which doesn't include a memory line itself into a watch set of the transactional memory system, but instead provides the page table entry of the memory line. With such a large object protection module 250, objects which are stored within large areas of memory can be protected. For example, in an embodiment where a single cache line contains 64 bytes, each cache line can protect 8 (8 byte) page table entries. Also, in various embodiments, the protected areas are multiples of 32 Kbytes and are aligned correspondingly (unless super pages or sparse allocation of page table entries are used).

Also, in various embodiments, the large objection protection module 250 does not provide rollback storage. Accordingly, these embodiments are mostly useful for large read sets. However, these embodiments can protect against remote reads and writes independently.

Figure 3:
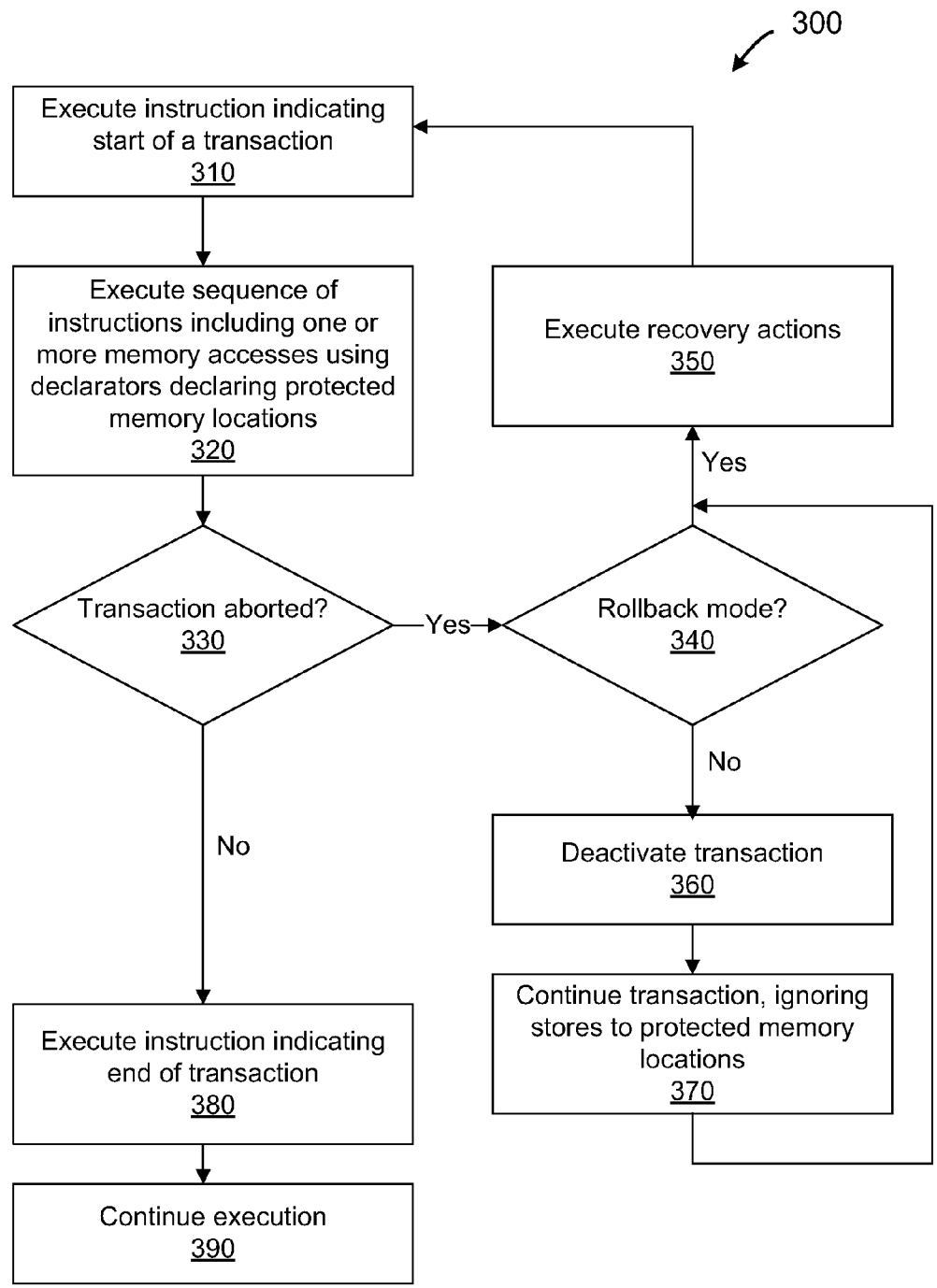
FIG. 3 is a general flow diagram showing a method for executing a transaction using an ASF.

FIG. 3 is a general flow diagram illustrating a method for executing a transaction using ASF, according to various embodiments. According to the illustrated embodiment, ASF may allow software (e.g., a thread) to begin a transaction (i.e., a critical section of code) by executing a given instruction (or multiple instructions) indicating the start of a transaction, as in 310. In various embodiments, ASF instructions such as SPECULATE or BEGIN may be used to indicate the start of a critical section.

After beginning a transaction, the thread may execute a series of instructions comprising the transaction body, as in 320. Such instructions may include a number of memory access (read and/or write) operations, some number of which may designate that the accessed memory location should be protected. A thread may designate that a given memory location should be protected by using one or more special declaratory instructions provided by ASF. ASF mechanisms may ensure that access to protected memory (as designated by declarator instructions) occur atomically with respect to all other concurrently executing threads in the system (i.e., all at once or not at all). For example, if the transaction includes multiple protected writes to memory, then ASF mechanisms may ensure that no other thread may observe the result of only a subset of those protected writes to memory. In another example, according to some embodiments, if the transaction includes one or more protected memory read operations, then ASF mechanisms may ensure that the transaction completes successfully only if no other thread has modified the protected read locations before the transaction has completed. In various embodiments, a "memory location" protected by a declarator operation may be of different sizes, such as that of a system dependent cache block or of another size.

According to such embodiments, ASF may be configured to protect only memory lines that have been specified using designated declarator instructions. In such embodiments, all other memory locations may remain unprotected and may be modified inside a critical section using standard x86 instructions. These modifications to unprotected memory may become visible to other CPUs immediately upon execution, for example, in program order. In some embodiments, a transaction body (e.g., instructions executed in 320) may comprise one or more other transactions (i.e., nested transactions).

According to various embodiments, if one or more conditions of the transactional execution have been violated, then the transaction may abort (as indicated by the affirmative exit from 330). In various embodiments, transactional attempts may be aborted at any point because of contention with other processors, far control transfers (such as those caused by interrupt and faults), execution of explicit software ABORT instructions, insufficient hardware resources, other implementation-specific conditions, etc.

In various embodiments, when a transactional attempt aborts, different recovery actions may be taken depending on the mode of transactional execution. In various embodiments, for each transaction, ASF may support a rollback mode of execution and/or a store-conditional mode of execution. In some embodiments, the mode of execution may determine what actions are performed in response to a transactional attempt being aborted. For example, in some embodiments, aborting a transaction in rollback mode may cause execution to be "rolled back" to the start of the transaction while aborting a transactional attempt in store-conditional mode may cause the transaction to continue but with transactional store operations not being performed (i.e., execution of transactional stores may be conditional on the transaction not having been aborted).

According to the illustrated embodiment, when a transaction executing in rollback mode aborts (as indicated by the affirmative exit from 340), ASF mechanisms may be configured to execute recovery actions, as in 350, which may include discarding modifications to the contents of the protected lines. By discarding such modifications, as in 350, ASF mechanisms may cause the modifications to be unobservable to other threads in the system, thereby complying by the atomicity property of the transaction. However, ASF mechanisms may be configured to not roll back modifications to unprotected memory, such as those performed using conventional x86 memory instructions. In some embodiments, the application programmer may provide software for accommodating these unprotected modifications, such as software recovery routines configured to reenter an initialization sequence leading up to the critical section.

In various embodiments, the recovery actions of 350 may be configured to roll back only a subset of the system registers (e.g., rIP and rSP) rather than all registers. In such embodiments, software may therefore be written to not rely on the content of various registers when entering transactional execution (e.g., by ignoring the initial contents of some registers after an abort event and/or to not modifying various registers during transactional execution).

In some instances, before an interrupt or exception handler returns, operating system code or other processes may have executed in the interim. Furthermore, in some instances, other processes may have even executed ASF transactions that inspected and/or modified locations targeted by the interrupted transaction. In some embodiments, ASF mechanisms may obviate these concerns by not maintaining any ASF-related state across context switches. Instead, in such embodiments, when the interrupted thread returns to the processor, ASF mechanisms may be configured to automatically abort and reattempt the transaction.

According to the illustrated embodiment, after executing some recovery action or actions, the thread may then reattempt the transaction, as indicated by the feedback loop from 350 to 310.

In some embodiments, an abort of a transaction executing in store-conditional mode (as indicated by the negative exit from 340) may be handled differently from an abort of a transaction executing in rollback (as indicated by the affirmative exit from 340). For example, while an abort of a rollback mode transaction may automatically reset execution flow to the beginning of the critical section (or to other recovery code), an abort of a transaction in store-conditional mode may be handled by undoing or otherwise discarding changes made by the critical section to values in protected memory locations and then and "deactivating" the transaction, as in 360. In various embodiments, deactivating the transaction may include setting a status code indicating that an abort has occurred and/or that the transaction is no longer active. In store-conditional mode, after the transaction is deactivated (as in 360), the system may continue to execute the critical section without executing any store operations to protected memory locations (as in 370). For example, after the transaction is deactivated, subsequent store operations to protected memory locations may be treated as no-ops.

In some embodiments, when the aborted transaction completes, a status code may be set in a register, such as rAX register 216 to indicate that the transaction was aborted. In some embodiments, the thread may be configured to detect that an abort status code has been set and perform one or more recovery actions, as indicated by the feedback loop from 370 to 350. In various embodiments, the recovery actions of 350 may be different for transactions that were aborted in store-conditional mode (i.e., from 370) than for those that were aborted in rollback mode (i.e., from 340). A more detailed discussion of transactions in rollback and store-conditional modes is provided below.

According to the illustrated embodiment, once the transaction body has been completed, the thread may execute one or more instructions indicating the end of the transaction to the ASF mechanisms, as in 380, such as a COMMIT instruction as discussed below. After committing the transaction, as in 380, the thread may continue execution, as in 390.

In some embodiments, ASF may support nesting of one or more transactions within one or more other transactions. For example, after a transaction is started as in 310 e.g., by executing a SPECULATE command), the instructions of the transaction body being executed in 320 may begin another transaction (e.g., by executing another SPECULATE command) before the first transaction completed. In this case, the second ("child") transaction may be said to be "nested" within the first ("parent") transaction. A transaction that is not nested within any other transaction may be referred to herein as a "top-level" transaction.

According to various embodiments, if one or more conditions of the transactional execution have been violated, then the transaction may abort (as indicated by the affirmative exit from 330). In various embodiments, transactional attempts may be aborted at any point because of contention with other processors, far control transfers (such as those caused by interrupt and faults), execution of explicit software ABORT instructions, insufficient hardware resources, other implementation-specific conditions, etc.

According to the illustrated embodiment, the execution of SPECULATE may then determine whether the transaction is a top level transaction, as in 530. In some embodiments, this determination may comprise checking the value of the incremented nesting level to determine whether the current transaction is nested. If the transaction is a top-level transaction, as indicated by the affirmative exit from 530, then executing SPECULATE may comprise recording a checkpoint including information usable by the processor to return execution to a given rollback point if the transaction is aborted. In some embodiments, recording the checkpoint may include recording the values that the instruction pointer (e.g., rIP 214) and stack pointer (e.g., rSP 212) will have immediately after the SPECULATE instruction has been executed, as in 535 and 540. Thus, in case of an abort, the recorded checkpoint may be used to transfer control to the instruction immediately following the SPECULATE instruction. In some embodiments, executing SPECULATE may further comprise setting or modifying values in one or more other registers, such as in rFLAGS register 218 to indicate processor states.

In some embodiments, while a SPECULATE instruction may begin a transaction in rollback mode, a different instruction (e.g., BEGIN) may begin a transaction in storeconditional mode.

FIG. 6 illustrates the steps of executing a BEGIN instruction, according to some embodiments. Method 600 may begin by determining one or more validity conditions for the transaction. In some embodiments, these conditions may be analogous to those checked when executing a SPECULATE transaction. For example, in method 600, executing BEGIN comprises determining whether a maximum nesting level has been reached (as in 605) and determining whether the current transaction is being nested within another store-conditional section (as in 610). If either condition is true (as indicated by the affirmative exits from 605 and 610 respectively), ASF mechanisms may be configured to raise a GP or other fault, as in 615. Otherwise, according to method 600, executing BEGIN may include resetting the rAX or other register (e.g., to zero), as in 620, incrementing the nesting level (as in 625), and setting a flag indicating that the current transaction is in store-conditional mode (as in 630) and proceeding with transactional execution of the transaction body (as in 635). In various embodiments, the flag set in 630 may be used to determine whether the current transaction is in storeconditional mode, such as in steps 510 and 610.

In some embodiments, ASF mechanisms may define various memory-reference instructions, called declarators, for designating which memory locations should be protected as part of a transaction (i.e., the memory locations for which atomic access is desired). For example, in some embodiments, ASF mechanisms may expose a declaratory memory access instruction for reading memory that is analogous to the standard x86 MOV instruction. Like the traditional MOV instruction, an ASF-defined LOCK MOV instruction may be used for loading values from memory. However, according to some embodiments, if a thread reads a memory location inside of a transaction using the LOCK MOV instruction, then ASF mechanisms may add the memory cache block containing the first byte of the referenced memory location to the set of protected cache blocks. In some embodiments, software mechanisms may ensure that unaligned memory accesses do not span both protected and unprotected lines. According to some embodiments, a declarator instruction referencing an already protected cache block may behave like a regular memory reference and not change the protected status of the block. In some embodiments, declarators may not be permitted outside of a critical section (e.g., an exception may be raised). In some embodiments declarators outside of critical section may be treated like regular memory operations. This may be the case for some embodiments wherein store-conditional mode is available.

In some embodiments, ASF mechanisms may define declarators other than LOCK MOV instructions. For examples, instructions analogous to x86 PREFETCH and/or PREFETCHW may be used (e.g., LOCK PREFETCH, LOCK PREFETCHW). Like their x86 analogs, LOCK PREFETCH and LOCK PREFETCHW may be used to fetch a value from memory into cache for reading (PREFETCH) or for writing (PREFETCHW). However, unlike standard prefetches without a LOCK prefix, LOCK PREFETCH and LOCK PREFETCHW may make a memory location protected. In addition, in some embodiments, LOCK PREFETCH and LOCK PREFETCHW may also check the specified memory address for translation faults and memory-access permission (read or write, respectively) and generate a page fault if unsuccessful. In some embodiments, LOCK PREFETCH and LOCK PREFETCHW may generate a #DB exception when they reference a memory address for which a data breakpoint has been configured.

In some embodiments, once a memory location has been protected using a declarator, it may be modified again speculatively, but not nonspeculatively, within the transaction. For example, in some embodiments, after a memory location has been read using a LOCK MOV read instruction, the value stored in the memory location may be speculatively modified using an ASF-defined LOCK MOV store instruction. According to embodiments, such speculative updates may become visible only when the transaction is committed. According to such embodiments, if the transactional attempt aborts, then speculative updates are rolled back and/or otherwise discarded. In some embodiments, during transactional execution, a memory location that has been protected using a declarator may only be modified using a speculative store instruction. In such embodiments, if a thread in transactional mode attempts to modify the value of a protected memory location using conventional non-speculative store operations, ASF mechanisms may raise an exception/fault (e.g., #GP(0)).

In some embodiments, if a speculative store instruction (e.g., LOCK MOV) is executed outside of a critical section, then an exception may be raised. In other embodiments, such as those wherein store-conditional mode is available, speculative stores outside of a critical section may be treated as a no-op.

In various embodiments, declarator memory instructions may participate in a system's cache coherence protocol. For example, if a LOCK MOV or LOCK PREFETCH instruction for reading a memory location misses in cache, it may send a non-invalidating probe to other processors, as dictated by the system's cache coherence protocols. In another example, if a given cache line does not already reside in the local cache in exclusive/owned status, then modifying it using a LOCK MOV instruction may result in sending an invalidating probe to other processors, as dictated by the system's cache coherence protocols. In some embodiments, executing a LOCK PREFETCHW instruction may also result in sending an invalidating probe, etc.

Various ASF mechanisms may be used to monitor and/or enforce protected memory locations (e.g., protected cache blocks). In some embodiments, ASF mechanisms may include an extension to one or more of the system's caches (e.g., memory caches 230), to indicate which cache lines (i.e., blocks) are protected. For example, in one embodiment, each line in a given cache may comprise a "protected" flag, which is set if the cache line is protected in a currently executing transaction and unset if it is not protected. In some embodiments, the protected flag may comprise one or more bits.

In some embodiments, ASF mechanisms for tracking protected cache lines may comprise a locked line buffer. In such embodiments, when a value in a protected memory location is modified (e.g., using a LOCK MOV instruction), an entry may be made into the locked line buffer to indicate the cache block and the value it held before the modification. In such embodiments, in the event of an abort of the transaction, the entries of the locked line buffer may be used to restore the pre-transaction values of each protected cache line to the local cache. In such embodiments, the locked line buffer may participate in a cache coherence protocol of the system, as described below.

In other embodiments, instead of using a locked line buffer to undo memory stores as described above, various ASF implements may instead prevent store instructions to protected memory locations in a critical section from being written to cache and/or memory before the transaction is committed. For example, ASF may be configured to keep all memory modifications in an internal store buffer and forward buffered values to subsequent load operations in the transaction. In such embodiments, once the transaction commits, ASF mechanisms may allow the buffered store operations in the internal store buffer to be written back to the cache.

In some embodiments, due to the fixed capacity of various ASF hardware components, various limitations may exist on the number of memory locations that may be simultaneously protected during a transaction (or set of nested transactions). For example, as discussed above, according to some embodiments, an implementation may require that all protected memory locations simultaneously reside in a data cache (e.g., memory caches 230) for the duration of the critical section. In such an embodiment, if a protected line is evicted from the cache during a transaction (e.g., due to capacity constraints), the critical section may be aborted. For example, a critical section that happened to reference N+1 memory locations that all mapped to the same set in an Nway associative data cache may fail to complete since at least one protected cache line would be evicted from cache when protected memory location N+1 is accessed. However, if a transaction performs a more distributed reference pattern, then it may be able to concurrently protect more memory locations than N before any one cache index is exceeded and a protected line is displaced from the data cache.

In various embodiments, capacity limitations other than cache associativity may exist. For example, in embodiments in which a locked line buffer is used, the maximum number of concurrently protected modified memory locations may be determined by the capacity of the locked line buffer. In another example, in embodiments utilizing a storebuffering scheme, ASF hardware capacity may be dependent on the capacity of the store buffer (i.e., the maximum number of outstanding stores supported by the system pipeline).

In various embodiments, ASF mechanisms may guarantee that a critical section will not fail due to insufficient hardware capacity as long as the number of protected locations does not exceed a given minimum guaranteed capacity. In various embodiments, this guarantee may be made regardless of where in the cacheable address space protected memory locations reside. For example, in embodiments that require that all protected memory locations simultaneously reside in a data cache, the minimum guaranteed capacity may be dependent upon the data cache's associativity (i.e., size of associativity sets). In various embodiments, if a transaction exceeds the hardware capacity, then the transactional attempt may abort.

In some embodiments, ASF mechanisms may allow a thread executing a transaction to remove an unmodified protected memory location from the transaction's set of protected memory locations. In some embodiments, the thread may accomplish this by executing an explicit RELEASE instruction provided by ASF. In some embodiments, when a protected memory location is released (e.g., using the RELEASE instruction), then it is no longer monitored for contention with other threads. For example, in embodiments wherein a protected flag is utilized, the value of the protected flag associated with the released cache block may be modified to indicate that the block is no longer protected. Thus, by removing an unmodified protected memory location from the set of protected memory locations, a thread may avoid unnecessary data conflicts with other threads and/or exceeding an ASF implementation's hardware capacity, which may lead to transactional aborts. In some embodiments, a RELEASE instruction may or may not guarantee that the specified protected memory location will be released. In some embodiments, only protected cache lines that have not been modified may be released.

As described above, in some embodiments, if a transaction attempts to protect (using declarators) more memory locations (e.g., cache blocks) than the ASF implementation's capacity can support then the transaction may be aborted. In other embodiments, the abort may be executed in response to a fault being raised.

In various embodiments, transactional aborts may also be caused by conditions other than insufficient hardware capacity. For example, an abort may be caused by memory contention, that is, interference caused by another processor attempting to access protected memory locations. In various embodiments, ASF mechanisms may be configured to detect various cache coherence messages (e.g., invalidating and/or noninvalidating probes) that may be relevant to one or more protected cache lines and determine whether the probe indicates that a data conflict exists. In response to detecting a data conflict, the ASF-mechanism may abort a transactional attempt. For example, consider a first thread executing in transactional mode and protecting a memory location (i.e., reading a memory location using a declarator instruction). If a second thread subsequently attempts a store to the protected memory location, then the processor executing the second thread may send an invalidating probe to the processor executing the first thread, in accordance with the particular cache coherence protocol deployed by the system. If the first processor receives the invalidating probe while the memory location is still protected (e.g., before the first thread commits its transaction or otherwise releases the memory location) then a data conflict may exist. In such an instance, ASF mechanisms may be configured to detect that the invalidating probe is relevant to a protected memory location and in response, abort the first thread's transaction.

According to various embodiments, a transaction may be aborted if ASF mechanisms detect that an invalidating probe relevant to a protected cache line is received. In some embodiments, a transaction may also be aborted if ASF mechanisms detect that a non-invalidating probe relevant to a modified protected cache line is received.

In some embodiments, ASF mechanisms allows read watches for read only memory areas where either there is no access right check for PREFETCHW or a PREFETCH-W_no_check instruction is defined. The PREFETCH-W_no_check enables the ASF mechanisms to protect memory lines containing active page tables (i.e., memory lines accessed and updated by the page table walker of a processor). In various other embodiments, the ASF mechanisms include an ASF_PROTECT_PT_AREA instruction which is similar to a LOCK MOV or PREFETCH instruction. The ASF_PROTECT_PT_AREA instruction walks page tables until a give level and issues a PREFETCH instruction of a target entry. The ASF_PROTECT_PT_AREA instruction includes a parameter that includes a virtual address in a target area (e.g., an ASF_PROTECT_PT_AREA mem parameter). The ASF_PROTECT_PT_AREA instruction also provides information regarding a known minimal protected area (e.g., a single page of undefined level). The ASF_PROTECT_PT_AREA instruction also covers additional virtual area due to cache lines covering several page table entries or a potentially larger page size for a give address.

Also, in various embodiments, the ASF_PROTECT_PT_AREA instruction further includes a level parameter. More specifically, in certain embodiments, this level parameter describe a page table entry (PTE level (e.g., PTE: 1), a page directory entry (PDE) level (e.g., PDE:2), a page directory pointer entry (PDPE) level (e.g., PDPE:3) and a page map level 4 entry (PML4E) level (e.g., PML4E:4). With this embodiment, the large object protection only occurs if the level matches with the actual page table.

Also, in various embodiments, the exact page boundary limits and page table mapping are adapted to coincide with the large object protection module 250. In these embodiments, a result level parameter is provided such as via a register. E.g., a parameter of 1 for 4K pages, 2 for 2M pages, etc. This embodiment also ensures that accessed and dirty bits are 0 to prevent a race with remote TLB shootdown.

Figure 4:
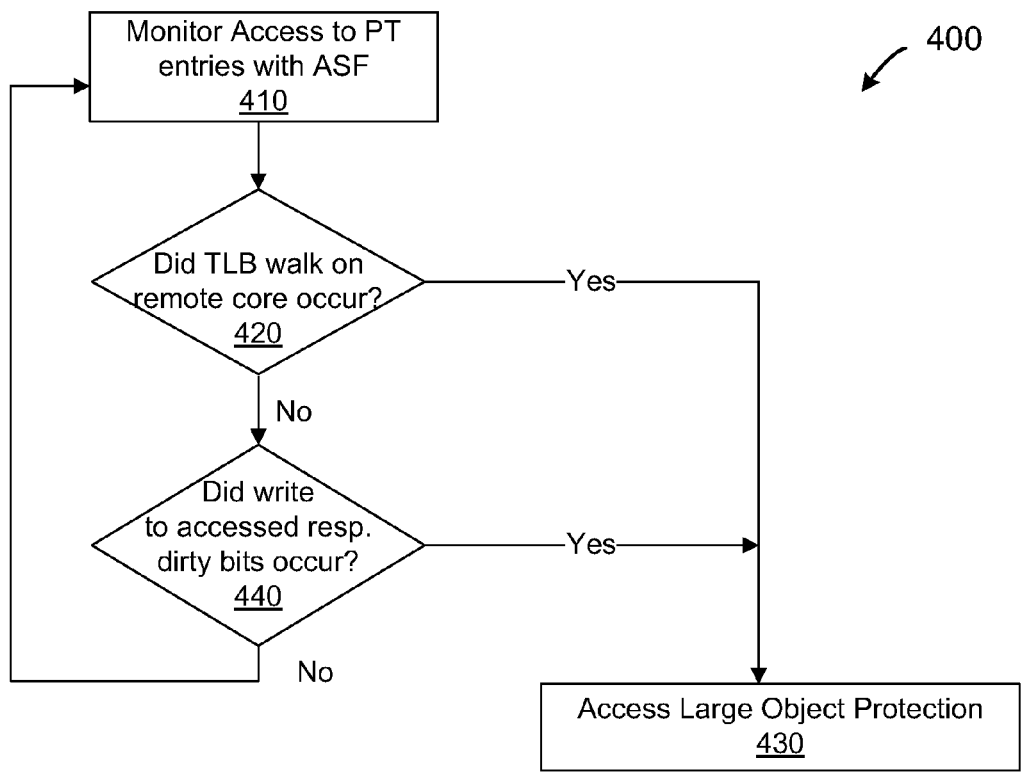
FIG. 4 is a general flow diagram showing a method for performing a large object protection operation.

FIG. 4 a general flow diagram illustrating a method for performing a large object protection operation, according to various embodiments. According to the illustrated embodiment, ASF provides a large object protection function. As discussed later, in various embodiments, ASF monitors access to page table entries and dirty bits to provide the large object protection function.

More specifically, the large object protection module 250 of ASF mechanism 240 within a processor 200 executes instructions which monitor access to page table entries, as in 410. While performing this monitoring, the large object protection module 250 executes instructions which determine whether a TLB walk on a remote core has occurred, as in 420. If so, then the large object protection module 250 executes instructions to perform a large object protection operation, as in 430. If not, then the large object protection module 250 executes instructions to determine whether a write to accessed representative dirty bits has occurred, as in 440. If so, then the large object protection module 250 executes instructions to perform a large object protection operation, as in 430. If not, then the large object protection module 250 continues to execute instructions which monitor access to page table entries, as in 410.

There is a plurality of usage scenarios in which the large object protection module 250 can be advantageous. For example, the large object protection module 250 can be advantageous in a read protection usage scenario as well as a write protection usage scenario.

More specifically, in a read protection usage scenario, other cores may only read, but not write, to the large object protection module 250. This usage scenario is applicable for a plurality of conditions. More specifically, this usage scenario is applicable when clearing a dirty bit within a page table entry. In various embodiments, clearing the dirty bit may be combined with setting an accessed bit. Also in various embodiments, clearing the dirty bit may be combined with a potential remote TLB shoot down condition. This usage scenario is also applicable when executing a SPECULATE instruction. This usage scenario is also applicable when executing a declarator instruction. More specifically, a write declarator instruction may be used on a page table entry containing the target dirty bit to identify a page table walk condition of a remote core or a read declarator instruction may be used to identify when a remote core writes a dirty bit. This usage scenario is also applicable when checking for a set dirty bit (i.e., to identify if a race with another core is present). If this condition is identified, then the current transaction is aborted.

More specifically, in a write protection usage scenario, other cores may neither read nor write to the large object protection module 250. This usage scenario is applicable for a plurality of conditions. More specifically, this usage scenario is applicable when clearing accessed and dirty bits within a page table entry. In various embodiments, clearing the accessed and dirty bits may be combined with a kernel consequences operation. Also in various embodiments, clearing the accessed and dirty bits may be combined with a potential remote TLB shoot down condition. This usage scenario is also applicable when executing a SPECTULATE instruction. This usage scenario is also applicable when executing a declarator instruction. More specifically, a write declarator instruction may be used on a page table entry containing the target accessed and dirty bits to identify a page table walk condition of a remote core or a read declarator instruction may be used to identify when a remote core writes a dirty bit. This usage scenario is also applicable when checking for a set accessed or dirty bit (i.e., to identify if a race with another core is present). If this condition is identified, then the current transaction is aborted.

Figure 5:
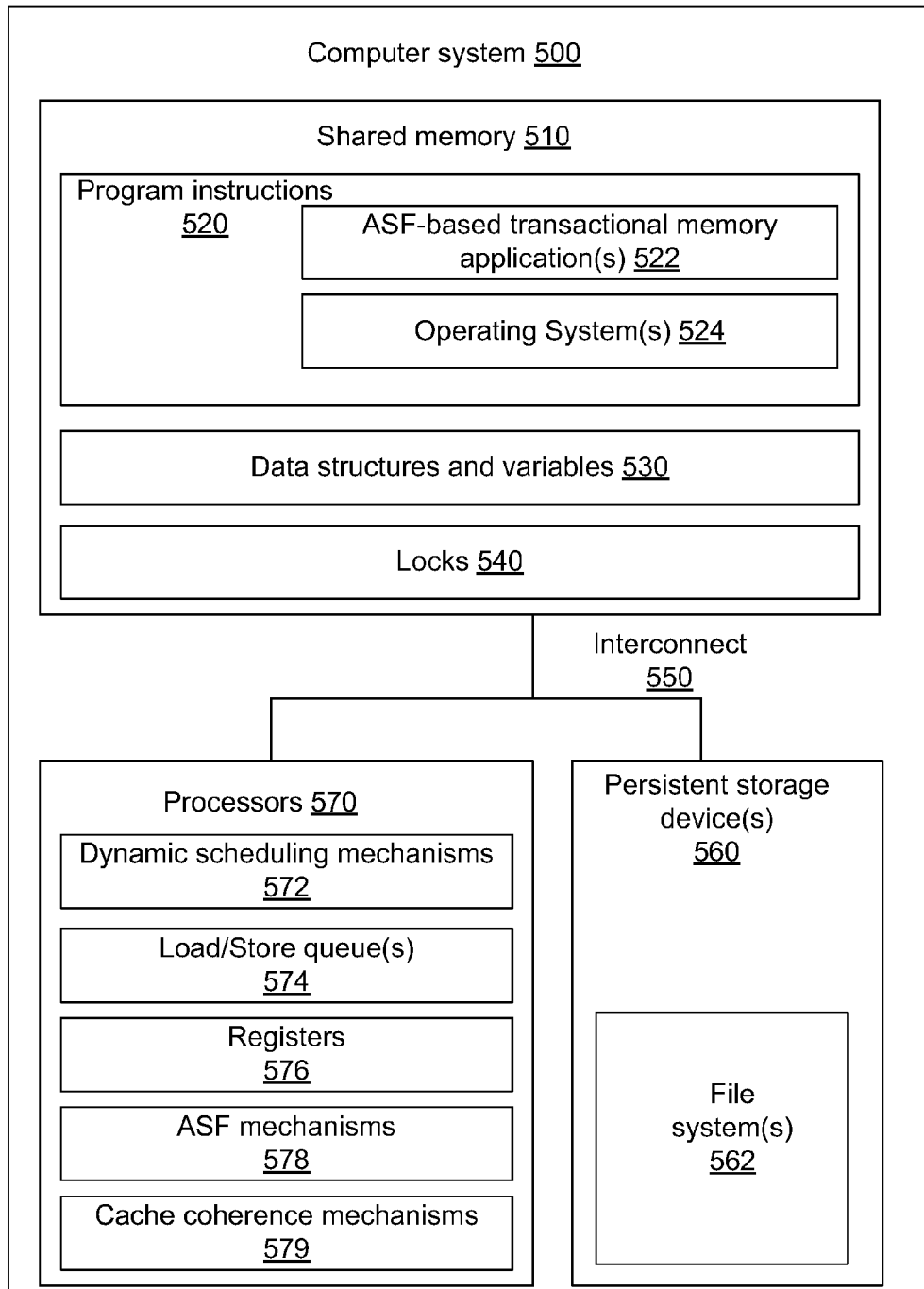
FIG. 5 is a generalized block diagram showing a computer system configured to implement various embodiments of an ASF.

FIG. 5 illustrates one embodiment of a computer system configured to implement various embodiments of ASF, as described herein. Computer system 500 may be any of various types of devices, including, but not limited to, a personal computer system, desktop computer, laptop or notebook computer, mainframe computer system, handheld computer, workstation, network computer, a consumer device, application server, storage device, a peripheral device such as a switch, modem, router, etc., or in general any type of computing device.

Computer system 500 may include a plurality of processors 570, each of which may include multiple cores, any of which may be single or multi-threaded (e.g., simultaneous multi-processing, Hyperthreading™, etc.). In some embodiments, processors 570 may include dynamic scheduling mechanisms 572, such as those capable of delaying speculative stores in load/store queues 574 for implementing a speculative store buffer, as described herein. In some embodiments, processors 570 may include various load, store, and/or load/store queues, such as 574, for holding inflight memory operations in the processor pipeline. Processors 570 may also include registers 576, such as rAX, rFLAGS or other special purpose registers, such as ones used for recording nesting depth, transactional mode, or status (active vs. inactive) of a transaction. In some embodiments, processors 570 may include any number of ASF hardware transactional memory mechanisms 578, as described herein. For example, ASF mechanisms 578 may include a locked line buffer and/or hardware logic for monitoring memory locations protected by an active transaction. In some embodiments, processors 570 may also include various cache coherence mechanisms 579, which may be used to implement different cache coherence protocols (e.g., MESI, MOESI, etc.) and may be used by ASF mechanisms to detect conflict aborts, as described herein.

The computer system 500 may also include one or more persistent storage devices 560 (e.g. optical storage, magnetic storage, hard drive, tape drive, solid state memory, etc.), which may store files, for example, by using a file system, such as file system 562. Computer system 500 may include one or more memories 510 (e.g., one or more of cache, SRAM, DRAM, RDRAM, EDO RAM, DDR RAM, SDRAM, Rambus RAM, EEPROM, etc.) shared by the multiple processors. Various embodiments may include fewer or additional components not illustrated in FIG. 5 (e.g., video cards, audio cards, additional network interfaces, peripheral devices, a network interface such as an ATM interface, an Ethernet interface, a Frame Relay interface, etc.).

Processors 570, storage device(s) 560, and shared memory 510 may be coupled to system interconnect 550. One or more of the system memories 510 may contain program instructions 520. Program instructions 520 may be encoded in platform native binary, any interpreted language such as Java™ byte-code, or in any other language such as C/C++, Java™, etc or in any combination thereof.

Program instructions 520 may include program instructions executable to implement one or more ASF-based transactional memory applications 522. Each application 522 may be multithreaded and may be configured to utilize ASF transactional memory mechanisms. In some embodiments, one or more of applications 522 may be configured to operate using both ASF transactional memory instructions as well as mutual exclusion locks, as described herein. In such embodiments, shared memory 510 may include various data structures and variables 530, any of which may be associated with one or more mutual exclusion locks 540.

In some embodiments, program instructions 520 and/or ASF-based transactional memory applications 522 may be provided as an article of manufacture that may include a computer-readable storage medium having stored thereon instructions that may be used to program a computer system (or other electronic devices) to perform a process according to various embodiments. A computer-readable storage medium may include any mechanism for storing information in a form (e.g., software, processing application) readable by a machine (e.g., a computer). The machine-readable storage medium may include, but is not limited to, magnetic storage medium (e.g., floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of tangible medium suitable for storing program instructions. In addition, program instructions may be communicated using intangible media-optical, acoustical or other form of propagated signal (e.g., carrier waves, infrared signals, digital signals, etc.).

Additionally, some embodiments can be fabricated using well know techniques that can implemented with a data processing system using code (e.g., Verilog, Hardware Description Language (HDL) code, etc.) stored on a computer usable medium. The code comprises data representations of the circuitry and components described herein that can be used to generate appropriate mask works for use in well known manufacturing systems to fabricate integrated circuits embodying aspects of the invention.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. An apparatus comprising:
   a processor coupleable to a shared memory that is shared by one or more other processors, wherein the processor is configured to execute a section of code that includes a plurality of memory access operations to the shared memory; and
   the processor comprising a large object protection module, the large object protection module configured to allow protection of areas larger than memory lines by monitoring accessed and dirty bits in one or more page tables.

2. The apparatus of claim 1 wherein:
   the processor comprises first and second associative structures, the second associative structure having a different set granularity than the first associative structure so as to at least partially filter out false positives for cache conflicts.

3. The apparatus of claim 2 wherein:
   the second associative structure is of a size such that the associative structure of a set specifies a region in which conflicting cache lines lie.

4. The apparatus of claim 3 wherein:
   if entries within the region are evicted from the second associative structure, the large object protection module is configured to track an entire index of the second associative structure to filter out false positives depending on a granularity and a number of indices present.

5. The apparatus of claim 3 wherein:
   the second associative structure is configured to correspond to a structure of translation look aside buffer (TLB).

6. A multiprocessor computer system comprising:
   a shared memory; and
   a plurality of processors coupled to the shared memory, each of the plurality of processors being configured to execute a section of code, the section of code comprising a plurality of memory access operations to the shared memory and each of the plurality of processors comprising a large object protection module, the large object protection module configured to allow protection of areas larger than memory lines by monitoring accessed and dirty bits in one or more page tables.

7. The multiprocessor computer system of claim 6 wherein:
   each of the plurality of processors comprises first and second associative structures, the second associative structure having a different set granularity than the first associative structure so as to at least partially filter out false positives for cache conflicts.

8. The multiprocessor computer system of claim 7 wherein:
   the second associative structure is of a size such that the associative structure of a set specifies a region in which conflicting cache lines lie.

9. The multiprocessor computer system of claim 8 wherein:
   if entries within the region are evicted from the second associative structure, the large object protection module is configured to track an entire index of the second associative structure to filter out false positives depending on a granularity and a number of indices present.

10. The multiprocessor computer system of claim 8 wherein:
    the second associative structure is configured to correspond to a structure of translation look aside buffer (TLB).

11. In a system comprising a memory shared among a plurality of processors, a method comprising:
    executing a section of code via one of the plurality of processors, the section of code comprising a plurality of memory access operations to the shared memory; and
    monitoring accessed and dirty bits in a page table so as to provide protection of areas larger than memory lines.

12. The method of claim 11 further comprising:
    providing each of the plurality of processors with first and second associative structures, the second associative structure having a different set granularity than the first associative structure so as to at least partially filter out false positives for cache conflicts.

13. The method of claim 12 wherein:
    the second associative structure is of a size such that the second associative structure exactly specifies a region in which conflicting cache lines lie.

14. The method of claim 13 wherein:
    if entries within the region are evicted from the second associative structure, then tracking an entire index of the second associative structure to filter out false positives depending on a granularity and a number of indices present.

15. The method of claim 13 wherein:
    the second associative structure is configured to correspond to a structure of translation look aside buffer (TLB).

16. A non-transitory computer readable medium comprising code stored therein, said code being executable by a processor to fabricate a multiprocessor computer system, said multiprocessor computer system comprising:
    a shared memory;
    a plurality of processors coupled to the shared memory, each of the plurality of processors being configured to execute a section of code, the section of code comprising a plurality of memory access operations to the shared memory and comprising a large object protection module, the large object protection module allowing protection of larger areas than memory lines by monitoring accessed and dirty bits in page tables.

17. The non-transitory computer readable medium of claim 16 wherein:
    each of the plurality of processors comprise first and second associative structures, the second associative structure having a different set granularity than the first associative structure so as to at least partially filter out false positives for cache conflicts.

18. The non-transitory computer readable medium of claim 17 wherein:
    the second associative structure is of a size such that the second associative structure exactly specifies a region in which conflicting cache lines lie.

19. The non-transitory computer readable medium of claim 18 wherein:
    if entries within the region are evicted from the second associative structure, the large object protection module is configured to track an entire index of the second associative structure to filter out false positives depending on a granularity and a number of indices present.

20. The non-transitory computer readable medium of claim 18 wherein:
the second associative structure is configured to correspond to a structure of translation look aside buffer (TLB).

* * * * *